United States Patent

Gaarder et al.

[15] 3,641,993
[45] Feb. 15, 1972

[54] NONLINEAR ELECTROMYOGRAPH

[72] Inventors: Kenneth R. Gaarder, Chevy Chase; William B. Leaf, Silver Spring, both of Md.

[73] Assignee: Prototypes, Inc., Kensington, Md.

[22] Filed: Apr. 23, 1970

[21] Appl. No.: 31,344

[52] U.S. Cl. ............................................. 128/2.1 R, 3/1.1
[51] Int. Cl. ............................................................ A61b 5/05
[58] Field of Search .................. 128/2.06 A, 2.06 B, 2.06 G, 128/2.06 R, 2.1 R, 419 R; 3/1.1

[56] References Cited

UNITED STATES PATENTS

| | | | |
|---|---|---|---|
| 2,712,975 | 7/1955 | Golseth et al. | 128/2.1 R |
| 3,426,150 | 2/1969 | Tygart | 128/2.06 R |
| 3,135,264 | 6/1964 | Tischler | 128/2.06 A |

OTHER PUBLICATIONS

Fink et al., "IRE Transactions on Medical Electronics" Vol. ME-6, No. 3, Sept. 1959, pp. 119, 120

Primary Examiner—William E. Kamm
Attorney—Cushman, Darby & Cushman

[57] ABSTRACT

This specification discloses an electrical apparatus which measures human muscle activity and provides both visual and audio information relative to such activity for feedback to the human. Slight skin voltages caused by muscle activity are assumed by electrodes, transmitted via shielded electrical leads and processed by the apparatus, first to provide a visual display of the instantaneous logarithm of the peak value of such signals and secondly to provide a visual display of an accumulation or integration of the instantaneous logarithm of the peak signal values over a selectable and timed integration interval. In addition to these visual indications for human feedback, an audio signal, with a frequency proportional to the instantaneous logarithm of the peak value, is provided as a string of sharp pulses thus allowing human discrimination at very low frequencies such as 1 Hz.

10 Claims, 2 Drawing Figures

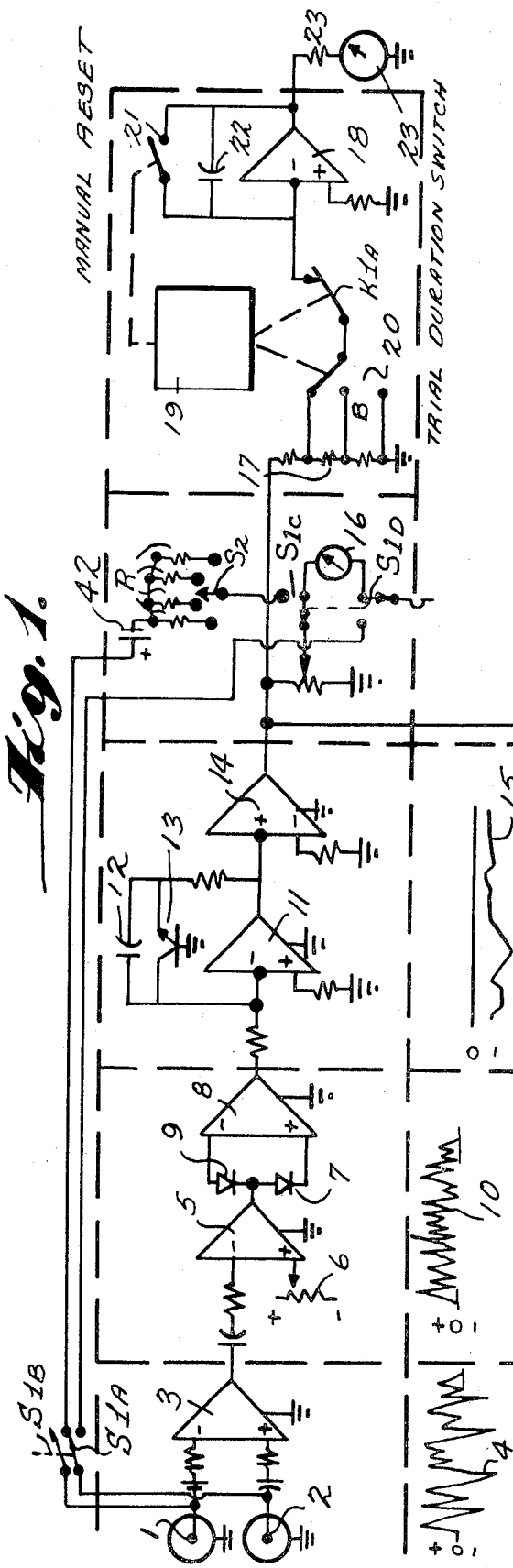
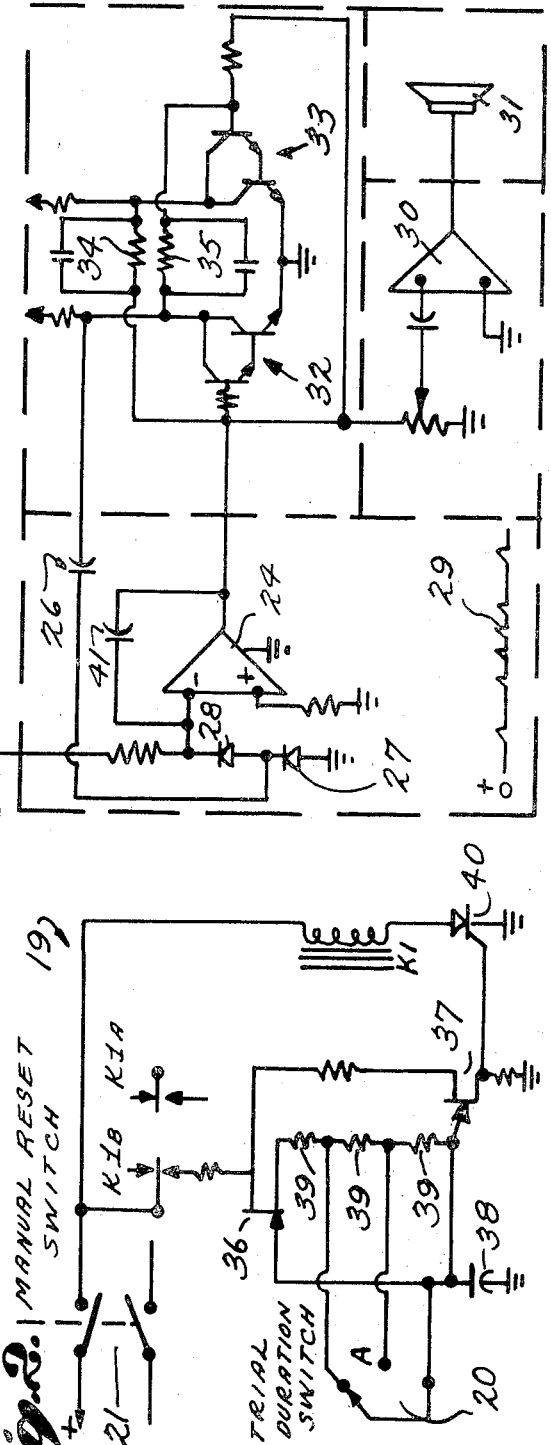
INVENTORS
KENNETH R GAARDER
WILLIAM B. LEAF
BY Cushman, Darby & Cushman
ATTORNEYS

NONLINEAR ELECTROMYOGRAPH

This invention relates to an electrical apparatus known as an electromyograph (EMG) which detects muscle activity in a living tissue by measuring the peak magnitude of voltages between at least two skin electrodes and providing an indication of the relative level of such activity, either for research purposes or for direct feedback to the animal or human involved. Such instruments are useful, for instance, in teaching persons relaxation by learning to exercise conscious control over their own muscle activity while observing some kind of feedback information indicating the level of such activity.

Although some prior attempts have been made to produce a useful device for this general purpose, all these prior devices have had deficiencies which have limited their practical value in a clinical environment.

Prior electromyograph devices required the coupling together of many different electronic components for which a practicing medical or psychiatric clinician is not usually prepared. Further, since the level of muscle activity is variable over a relatively large range, the prior existing devices required constant readjustment of various gain settings which disturbance was both disrupting to the patient's progress and confusing to the clinician who might have only a hazy concept of the meaning of various gain adjustments.

In addition to these disadvantages, in the past, it was necessary to securely tape electrodes to the skin and even then electrical noise and erratic readings were often the result unless operation was within a special electrically shielded room.

Finally, existing devices provided only rather gross visual indications for information feedback to the patient, which often made it impossible for patients to detect small changes in the rate of muscle activity. The net result of all these limitations was that, although prior EMG feedback devices were known, they were not completely satisfactory for their intended purpose due to one or more deficiencies.

Accordingly, it is an object of the present invention to combine all the necessary electrical devices for a successful EMG feedback device into one compact apparatus thus obviating any need for clinicians to interconnect a plurality of instruments.

Another object of this invention is to eliminate the need for constant gain adjustments by converting the EMG feedback peak signal magnitude to nonlinear (in this instance logarithmic) form thus providing automatic high gain at low activity levels for maximum human feedback discrimination and relatively lower gains at high activity levels when human feedback discrimination is not so critical.

Still another object of this invention is to use electrically shielded electrode leads in combination with electrical means for automatically rejecting a large amount of commonly present electrical noise, thus allowing operation outside a shielded room environment.

It is also an object of this invention to provide two simultaneous forms of visual EMG feedback in the nature of an instantaneous nonlinear (logarithmic) display and an accumulated or integrated nonlinear (logarithmic) display where an interval of integration or a trial duration is automatically terminated and may be started or reset manually at will.

It is yet another object of this invention to provide audio EMG feedback simultaneously with, and in addition to, visual EMG feedback, such audio feedback having a frequency approximately proportional to the instantaneous nonlinear (logarithmic) EMG signal and comprised of relatively sharp pulses rather than relatively smooth waveforms to allow human auditory detection below the normal threshold of hearing, e.g., down to 1 Hz.

A further object of this invention is to provide a convenient ohmmeter means for assistance in adjusting the skin electrodes for acceptable or minimum skin resistance prior to the actual operation of the electromyograph apparatus.

A more complete and detailed understanding of this invention may be had by referring to the following detailed description of an illustrative embodiment together with the drawings in which:

FIG. 1 is a simplified schematic depiction of the various electrical elements embodied in this invention; and FIG. 2 is a more detailed circuit diagram of a possible circuit for an interval timer shown only in box form in FIG. 1.

Referring first to FIG. 1, skin electrodes are connected to shielded electrical leads 1 and 2 which are in turn connected as separate inputs to a differential amplifier 3. Thus, a plurality of balanced inputs are combined into a single unbalanced output voltage shown as waveform 4 with respect to a ground reference. Because the output from this amplifier is the algebraic difference between the two inputs, all common mode signals (primarily noise) will be cancelled out or rejected by this arrangement. Of course, it should be obvious to one skilled in the art that other analogous arrangements could be readily surmised if it is desired to use more than two electrodes.

Switch contacts $S_{1A}$, $S_{1B}$, $S_{1C}$ and $S_{1D}$ are all shown positioned for operation as an electromyograph. However, in placing the skin electrodes on the living subject, it is often necessary to insure that the electrode-to-skin resistance is below a predetermined value. With the device shown in FIG. 1, this may be readily accomplished by merely turning switch $S_1$ thereby connecting the skin electrodes, battery 42, meter 16 and a selected one of resistances R in a conventional ohmmeter circuit. By observing the meter 16 and making appropriate scale adjustments with switch $S_2$, the skin electrodes may then be positioned for a minimum or other acceptable value of skin-to-electrode resistance. Of course, meter 23 could be used instead of meter 16 if desired. Once the electrodes are properly positioned, switch $S_1$ is turned back to the position shown in FIG. 1 and the device functions as an electromyograph as described below.

The single common output 4 from amplifier 3 is delivered as input to a subtracting input of differential amplifier 5 which provides both amplification and a zero level offset adjustment with the aid of an adjustable direct current amplitude applied through potentiometer 6 to a summing input of amplifier 5. The AC output from 5 is then effectively full-wave rectified and further amplified by routing positive signal excursions through diode 7 to the summing input of differential amplifier 8, and routing negative signal excursions through diode 9 to a subtracting input of amplifier 8. The full-wave rectified output of amplifier 8 is depicted as waveform 10 in FIG. 1.

This full-wave rectified signal 10 is then presented to amplifier 11 which has capacitive feedback 12 such that this amplifier functions as a crude or first-approximation integration circuit. The value of this capacitance is chosen such that only a very crude integration is performed and for all practical purposes, the circuit functions only as a peak amplitude detector. The gain of amplifier 11 is further affected by a controlled amount of feedback through transistor 13 connected in shunt across capacitor 12. Transistor 13, as shown, is connected such that the base-emitter or control forward bias current is proportional to the output of amplifier 11. Thus, as the output of amplifier 11 increases, transistor 13 becomes more conductive and the net gain of amplifier 11 is effectively reduced.

If parameters are chosen properly, this inversely controlled gain will result in a compressed output approximately proportional to the instantaneous logarithm of the peak value of the full-wave rectified output from amplifier 8. Amplifier 14 is connected as a high-input impedance buffer amplifier for driving various indicating means to be described more fully below. The logarithmic output of amplifier 14 is depicted in FIG. 1 as waveform 15.

A visual display of this instantaneous logarithmic EMG waveform 15 is provided by meter 16. This signal is also presented to integrator 18 through one or more of resistors 17, contacts B of a trial duration switch 20 and a normally closed contact K1A of a relay associated with the interval timer 19. The various resistors connected to the contacts of trial duration switch 20 are used to determine a proper constant multiplying factor for the integrator, based upon a particular chosen trial duration interval. At the beginning of such an interval, a reset switch 21 is operated which discharges integration feedback capacitor 22 and thus resets the output of integrator 18 to zero. At the same time, a relay in the interval timer 19 is released and the normally closed contacts K1A are closed to connect the integrator 18 to the instantaneous logarithmic EMG signal from amplifier 14. An integrated output is then continuously accumulated by integrator 18 and is visually displayed on meter 23 throughout the duration of such an integration interval. The interval of integration is automatically terminated by the trial timer 19 which operates a relay to open contacts K1A and thus stop the integration process until reset switch 21 is again operated.

In addition, the instantaneous logarithmic EMG signal from 14 is also fed to an audio pulse integrator 24 which operates as a low-grade integrator to produce an output signal which rises at a rate dependent upon the instantaneous magnitude of the logarithmic EMG signal. Operational amplifier 24 is combined with compound transistors 32 and 33 to form a voltage-to-frequency converter. At equilibrium, current flowing toward the inverting input of 24 and originating at the output of amplifier 14 is exactly matched by an equal current of opposite polarity flowing from a diode-pump circuit formed by diodes 27 and 28 and capacitor 26. Together with proper biasing and load components, devices 32 and 33 form a conventional astable multivibrator with its square wave output driving the previously mentioned diode-pump circuit. Since the diode-pump furnishes a discrete current charge for each cycle of the multivibrator output, there can be only one frequency at which the input current from amplifier 14 is matched. The frequency of the multivibrator is controlled by the output of operational amplifier 24 and the charge built up across integrating capacitor 41 provides the required voltage to sustain the oscillations. The resulting output of 24 is a series of rising and sharply terminated pulses as is shown at waveform 29 in FIG. 1 with a repetition frequency dependent upon the instantaneous magnitude of the logarithmic EMG signal. These sharply terminated pulses are amplified by device 30 and converted to auditory sound waves by loudspeaker 31. Such discontinuous waveforms are preferable to a smoother waveform because the spectrum of frequencies inherent in such discontinuities allow human auditory detection at a basic pulse repetition rate far below that of ordinary hearing. The result would probably be described by an observer or a patient as "clicks" occurring with a variable frequency depending on the instantaneous magnitude of muscle activity. Parameters of electrical components may be chosen to insure normal pulse repetition frequencies from 1-100 Hz. thus allowing excellent human discrimination at both high and very low levels of muscle activity.

FIG. 2 should be referred to for an understanding of the trial interval timer 19 shown in FIG. 1 as the box 19. When manual reset switch 21 (same switch as shown in FIG. 1) is operated, the DC supply current is interrupted and relay K1 drops out. Then normally closed relay contacts K1B connect the DC supply voltage to capacitor 38, through device 36 and one or more of resistors 39 depending upon the desired charging time constant for capacitor 38. When the charge on capacitor 38 reaches a particular level, device 37 conducts and in turn triggers thyristor 40 which allows current to pass through the coil of relay K1 which then operates to open contacts K1B and K1A and terminate the timed integration interval as previously discussed.

While only one preferred embodiment of this invention has been particularly described in the above specification, it will be readily appreciated that this invention would also include all possible modifications obvious to one skilled in the art without departing from the scope of this invention.

What is claimed is:

1. An electrical apparatus for indicating degree of muscle activity by measuring skin voltages assumed by electrodes positioned adjacent to skin surfaces and caused by said muscle activity, said device comprising:

input means for connection to said electrodes and for receiving and amplifying said skin voltages, said input means including nonlinear means for amplifying said skin voltage in a nonlinear fashion providing relatively high gain at low skin voltage levels and increasingly lower gains at higher skin voltage levels to produce a nonlinear output signal proportional to a nonlinear function of said skin voltages, and feedback means connected to said input means for receiving said nonlinear output signal and for producing a humanly sensible feedback signal therefrom.

2. A device as in claim 1 wherein said feedback means comprises:

first means connected to said input means for visually displaying said nonlinear output signal proportional to a nonlinear function of said skin voltages;

second means also connected to said input means for simultaneous computation and visual display of a further signal proportional to an integrated value of said nonlinear output signal over a timed interval of integration; and third means also connected to said input means for simultaneously producing an audible pulse response having a frequency or pulse repetition rate dependent upon said nonlinear output signal.

3. A device as in claim 2 wherein said second means includes a timing means connected therein to automatically terminate said timed interval of integration.

4. A device as in claim 3 wherein said second means includes manual resetting means connected to initiate said timed interval of integration upon manual actuation.

5. A device as in claim 2 wherein said third means includes:

means connected to said input means for producing sharply shaped pulses of electrical energy having a relatively low pulse repetition rate proportional to the instantaneous value of said nonlinear output signal and, means connected to receive said sharply shaped pulses for converting said pulses to an audible audio response resembling a series of "clicks" thereby permitting human detection and discrimination at very low basic pulse or "click" repetition frequencies to permit precisely accurate audio signal feedback independent of any visual feedback to a human user of the device.

6. A device as in claim 2 including ohmmeter means for measuring the electrical resistance between said electrodes and said skin surfaces.

7. An electrical device for measuring muscle activity and for providing an indication of such activity, said device comprising:

electrodes for electrical contact with at least two points on a skin surface;

shielded electrical leads for conducting signals from said electrode means;

differential amplification means for combining electrical signals from said shielded leads into a single common output signal and for cancelling all common mode electrical signals;

electronic conversion means for obtaining a peak value of said common output signal and for producing a nonlinear signal proportional to a nonlinear function of said peak value;

visual display means to visually display said nonlinear signal;

first integration means for integrating said nonlinear signal and for producing an accumulated output signal during a times interval;

timing means to terminate said timed interval;

reset means to begin said timed interval;

visual display means to visually display said accumulated output signal;

pulse-generating means for producing electrical pulses at a frequency proportional to said nonlinear signal; and audio response means to provide an audible sound wave in response to said electrical pulses.

8. A device as in claim 7 wherein said electronic conversion means comprises:

full-wave rectifying means for rectifying said common output signal;

peak detection means with an input signal and an output signal including an operational amplifier with a controlled gain;

gain-controlling means to cause said controlled gain to vary inversely with respect to said output signal such that said output signal is approximately proportional to said nonlinear function of said peak value of said input signal.

9. A device as in claim 7 wherein said pulse-generating means includes:

second integrating means with an output and an input responsive to said nonlinear signal having a first polarity; and an automatic resetting means connected to the output of said second integrating means for delivery of resetting pulse signals at a frequency proportional to the output of said second integrating means and hence dependent upon said nonlinear signal.

10. A device as in claim 7 including ohmmeter means for measuring the electrical resistance between said electrodes and said skin surface.

* * * * *

UNITED STATES PATENT OFFICE
CERTIFICATE OF CORRECTION

Patent No. 3,641,993　　　　　　　　　Dated February 15, 1972

Inventor(s) Kenneth R. Gaarder and William B. Leaf

It is certified that error appears in the above-identified patent and that said Letters Patent are hereby corrected as shown below:

Data item No. 73, Assignee, change "Prototypes, Inc., Kensington, Md." to

--William B. Leaf's entire one-half interest to Prototypes, Inc., Kensington, Md.--

Signed and sealed this 22nd day of May 1973.

(SEAL)
Attest:

EDWARD M. FLETCHER, JR.　　　　　　　ROBERT GOTTSCHALK
Attesting Officer　　　　　　　　　　Commissioner of Patents